United States Patent [19]

Thomas

[11] 4,098,380
[45] Jul. 4, 1978

[54] GEAR SELECTOR MECHANISM

[76] Inventor: Dalton A. Thomas, Alpine Rte. 1, Box 97, Winterboro, Ala. 35014

[21] Appl. No.: 785,677

[22] Filed: Apr. 7, 1977

[51] Int. Cl.² .................... F16D 21/04; F16D 11/12; F16D 47/00
[52] U.S. Cl. .................................. 192/48.5; 192/48.7; 192/48.91; 192/67 R; 192/93 C; 192/108
[58] Field of Search ................... 192/48.5, 48.7, 48.91, 192/67 R, 93 C, 108

[56] References Cited

U.S. PATENT DOCUMENTS 3,780,840  12/1973  Thomas .......................... 192/48.91

*Primary Examiner*—Allan D. Herrmann
*Attorney, Agent, or Firm*—Bacon & Thomas

[57] ABSTRACT

A sleeve is splined to but axially slidable on a shaft between two gears rotatable relative to said shaft and having fixed lugs on their inner faces. A clutch ring is journalled on each end of the sleeve and provided with clutch dogs engageable with the lugs of one gear when the sleeve and ring are moved toward that one gear. A selector ring slides axially on the sleeve and when moved in one axial direction toward one of the gears it first positively clutches the advancing clutch ring to the sleeve then moves the sleeve and clutch ring toward that one gear to engage the clutch dogs of the advancing ring with the lugs on the one gear. Thereafter, when the selector ring is moved in the other direction, it first releases the clutched ring from the sleeve then repeats the above described clutching in the other direction.

7 Claims, 10 Drawing Figures

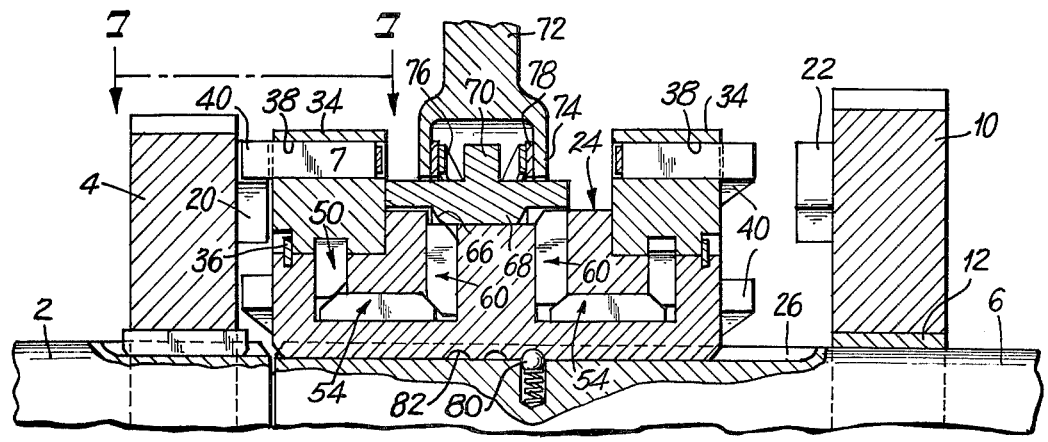
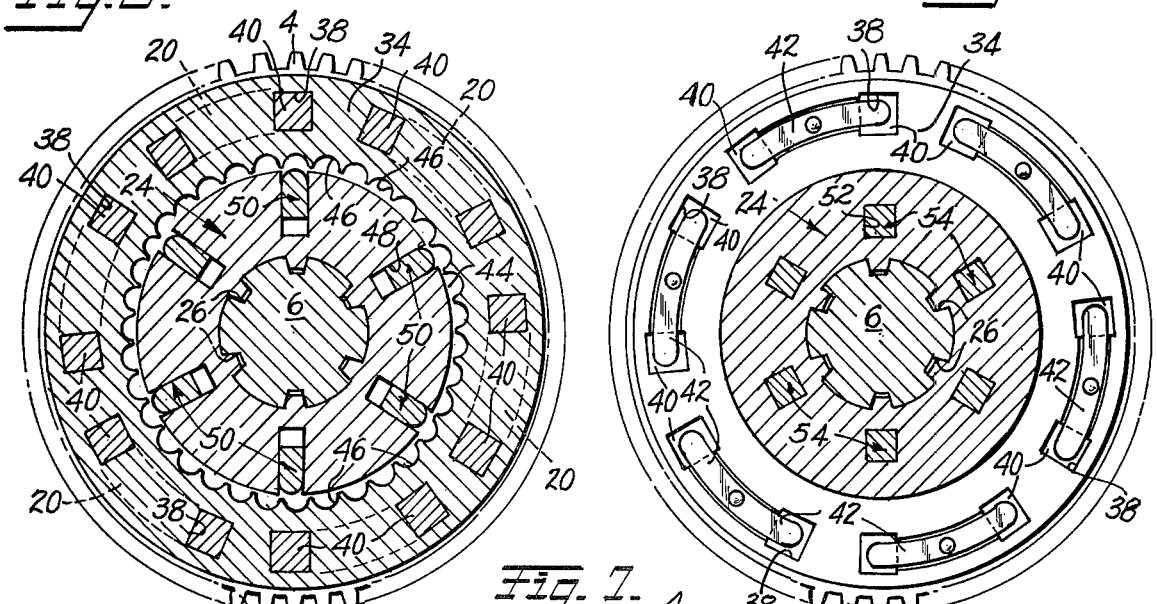
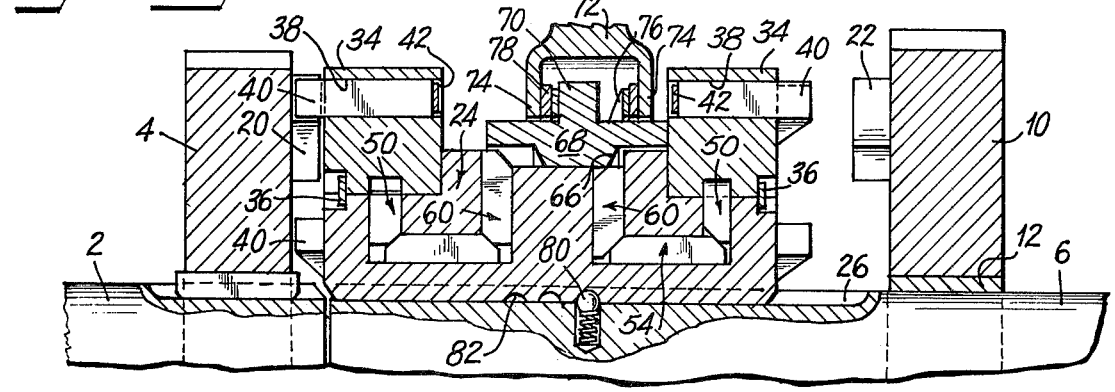

GEAR SELECTOR MECHANISM

BACKGROUND OF THE INVENTION

This invention is in the field of gear selector mechanisms of particular utility in automobile transmissions but also useful in other environments.

The invention disclosed herein constitutes an improvement of my prior U.S. Pat. No. 3,780,840. In my prior patent, a somewhat similar gear selector mechanism is dislcosed but it was found that difficulty was encountered in shifting to a lower ratio gear.

SUMMARY OF THE INVENTION

In accordance with the present invention, a mechanism is provided wherein either of two adjacent members rotatably mounted relative to a shaft, may be selectively connected to that shaft in driving engagement by means of a first clutch ring movable into driving engagement with one member and a second clutching arrangement between that clutch ring and the shaft. In this way, a clutch ring drivingly engaged with one of the members may be disengaged from the shaft prior to its disengagement from the member, thus rendering this disengagement from the member easy and requiring little force irrespective of any tendency of that member and shaft to rotate at different speeds.

BRIEF DESCRIPTION OF THE DRAWINGS

FIG. 2 is a transverse sectional view taken on the line 2—2 of FIG. 1;

FIG. 3 is a transverse sectional view taken on the line 3—3 of FIG. 1;

FIG. 5 is similar to FIG. 4 but shows the parts in another relative position;

FIG. 6 is similar to FIG. 5 but shows the parts in a still further different position of adjustment; and FIGS. 7, 8, 9 and 10 are detail views of different portions of the mechanism.

DESCRIPTION OF A PREFERRED EMBODIMENT

Figure 1:
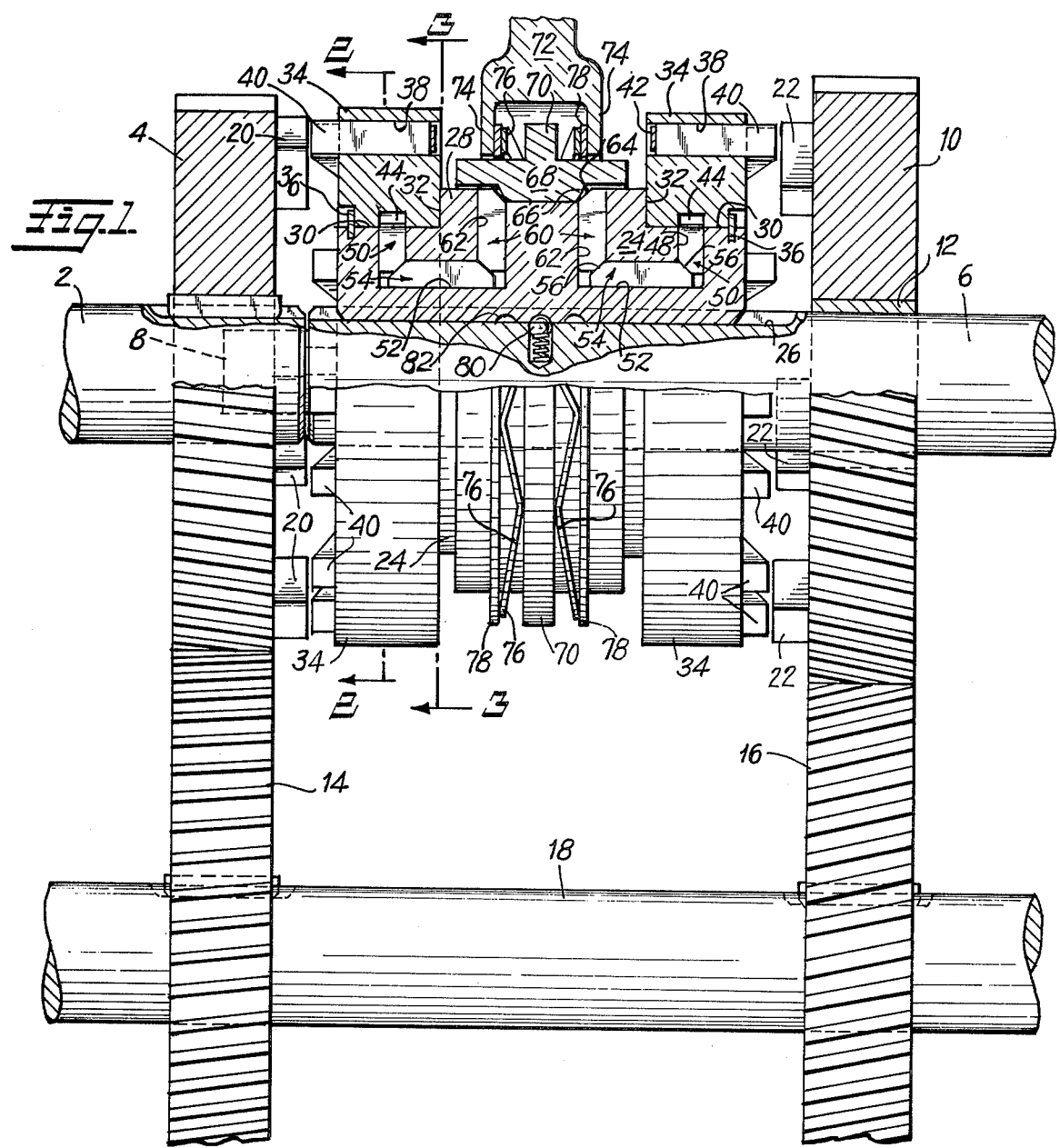
FIG. 1 is a schematic representative view of a portion of a transmission embodying the present invention and wherein certain parts are broken away and others are shown in section.

Referring first to FIG. 1, an input shaft 2 is shown having a driving gear 4 keyed thereon. An output shaft 6 is arranged coaxial to the shaft 2 but rotatable relative to the shaft 2 by means of the pilot bearing 8. An output gear 10 is journalled on the shaft 6, by means of any suitable bearing such as shown at 12, for rotation on the shaft 6. Gears 14 and 16 keyed on countershaft 18 are in mesh with gears 4 and 10, respectively. Thus, if gear 4 is clutched to the shaft 6, a direct drive through the transmission is established with gear 10 free to rotate relative to shaft 6. However, if gear 10 is clutched to shaft 6, instead of gear 4, a reduced speed drive from gear 4 through gear 14, shaft 18, gear 16 and gear 10 to shaft 6 is established.

The structure to be described may be employed to selectively clutch either gear 4 or 10 to the shaft 6 and while a single such selective clutching mechanism is shown, it is to be understood that other similar devices may be provided on either shafts 6 or 18 to establish further gear ratios through the mechanism. As shown, the gear 4 is provided with a circular series of spaced lugs 20 extending from its inner face, that is, the face nearest the gear 10. Those lugs may be integral with the gear or separately secured thereto. In like manner, the gear 10 is provided with a circular series of spaced lugs 22 on its inner face.

A selector sleeve 24 is slidably mounted on the shaft 6 by means of interengaging splines and grooves 26–27 whereby the sleeve is nonrotatable relative to shaft 6 but is capable of axial sliding movement thereon. The sleeve 24 is provided with a large diameter central portion 22 and reduced diameter end portions 30 separated by axially facing shoulders 32. On each of the reduced diameter portions 30, a clutch ring 34 is mounted for rotation relative to the sleeve 24. Each end of the sleeve 24 and each of the clutch rings 34 is identical so only one will be described in detail. A split ring retainer 36 holds each clutch ring 34 in close proximity to its adjacent shoulder 32 while permitting rotation between each clutch ring and the sleeve 24. Each of the clutch rings 34 is provided with a circular series of openings 38 therethrough and in each of which a clutch dog 40 is slidably mounted. The clutch dogs 40 are of the general shape best seen in FIG. 7, each being provided with an oblique end surface 42, for a purpose to be described. As best seen in FIG. 3, the slidable clutch dogs 40 are spring urged toward the adjacent gear by means of leaf springs 42 bearing against the inner ends thereof. From FIG. 7 it will be apparent that opposed sides of each pair of clutch dogs 40 are spaced apart a distance substantially equal to the space between adjacent lugs 20 or 22 on the gears. When clutch dogs 40 engage the lugs 20 in the manner shown in FIG. 7, the oblique surfaces 42 face obliquely inwardly in the space between the adjacent lugs 20.

On its inner periphery, each clutch ring 34 is provided with an inwardly facing channel 44 (see also FIG. 2), the bottom or outer periphery of which is formed to define a multiplicity of curved sockets 46. It is to be noted that the number of sockets 46 in the channel 44 is much greater than the number of clutch dogs 40 or gear lugs 20 or 22.

The reduced diameter portions 30 of the sleeve 24 are provided with a plurality of guide passages 48 aligned with the respective channels 44 and clutch pins 50 are radially slidable therein. Each radial passage 48 communicates with an axial passage 52 in which a cam member 54 is slidable, the cam member 54 and pins 50 being provided with matching cam or wedge surfaces at 56. In like manner, matching cam or wedge surfaces 58 between cam member 54 and radial member 60 are arranged as shown. Each of the radial members 60 slides in an opening 62 extending from passage 62 to the outer periphery of the central portion 28 of sleeve 24. The upper or outer ends of the radial members 60 are bevelled as shown at 64 and cooperate with a bevelled or cam surface 66 on a selector ring 68 axially slidable on the outer peripheral surface of the central portion of sleeve 24. The selector ring 68 has an outer peripheral central rib 70 and a shift fork device 72 is provided with spaced flanges 74 on opposite sides of the ribs 70 with substantial space between those flanges and the rib. Each of those spaces is occupied by an undulating flat spring 76 and a retainer ring 78. Since the shift fork and its flanges 74 embrace only the upper half of the ring 68, the retainer rings 78 hold the springs 76 against rib 70 around the lower half of ring 68. The springs 76 normally hold the shift fork 72 in centralized relation to the rib 70. As also shown in FIG. 1, a spring urged ball detent 80 is mounted in shaft 60 in position to engage any one of three recesses 82 in an aligned spline on the sleeve 24. The ball detent is of conventional construction and serves to releasbly hold the sleeve 24 in a selected one of three different positions.

Figure 4:
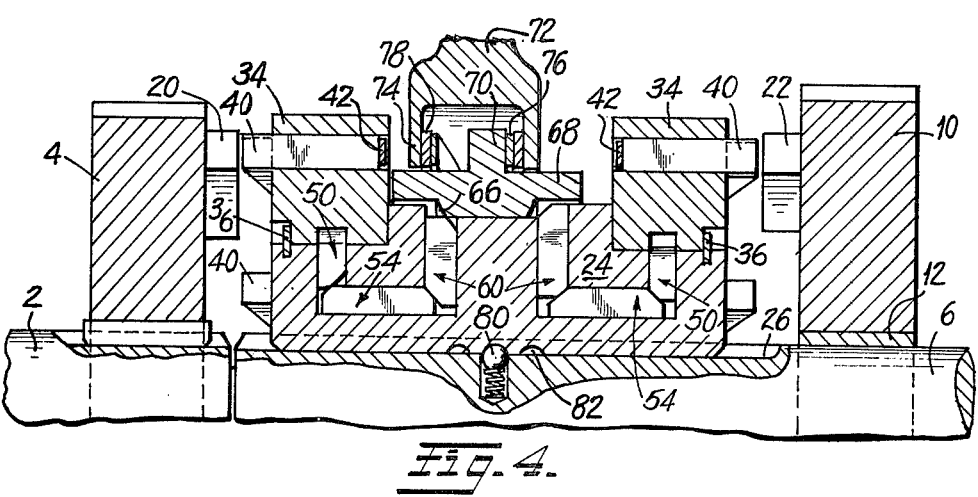
FIG. 4 is a view similar to the portion of FIG. 1 shown in section but showing the parts in different relative positions.

As shown in FIG. 1, the parts are in "neutral" position, that is, no torque can be transmitted from shaft 2 to shaft 6 since neither gear 4 or 10 is clutched to shaft 6. If it is desired to establish direct drive between the shafts 2 and 6, the shift fork 72 is moved to the left as shown in FIG. 4. This compresses one of the undulating springs 76 and applies the resilient pressure to a side of rib 70. This pressure is not sufficient to overcome the restraint provided by ball detent 80 but is sufficient to cause the left hand cam surface 66 of member 68 to depress radial members 60 and thereby effect camming of the associated clutch pins 50 outwardly into the channel of clutch ring 34. The pins 50 are forced outwardly sufficiently far to seat their correspondingly shaped outer ends in the recesses 46 and thereby effect a positive clutching of the left hand clutch ring 34 to the sleeve 24. It is to be understood that the illustrated camming and clutching elements 50-60 are duplicated around the sleeve 24, as best shown in FIG. 2, to thus provide secured clutching for the transmission of substantial torque. It is also to be noted that the selector ring 68 is so shaped and dimensioned that, when it is in the position of FIG. 4, its right hand end still overlies the radial members 60 at that end to sleeve 24 to prevent their leaving their respective openings 62. After the parts have been moved to the position of FIG. 4 as thus described, further force applied toward the left by shift fork 72 and spring 76 will move ring 68 into abutment with left hand ring 34 and thus urge sleeve 24 to the left and overcome the restraint of ball detent 80 and, particularly the resilient force of spring 76, will cause the sleeve 24 to snap to the left and thereby engage clutch dogs 40 in the spaces between lugs 20 of gear 4, the parts then being in the position shown in FIG. 5 with the gear 4 being clutched to the shaft 6 for direct drive. While not illustrated in the drawings, the final rapid movement of sleeve 24 toward gear 4 may result in the ends of some of the clutch dogs 40 impinging on the axially inner faces of lugs 20 rather than entering directly into the spaces between those lugs. Obviously, if that occurs, only alternate clutch dogs 40 will hit the tops of the lugs 20 and the intermediate clutch dogs will enter the space between lugs 20. However, that will not prevent sleeve 24 from moving to the position shown in FIG. 5 since the leaf springs 42 permit those dogs that engage the tops of the lugs to slide inwardly in their corresponding channels 38. Any tendency of the gear 4 and shaft 6 to rotate at different speeds under these conditions will result in the clutch dogs seeking alignment with the spaces between lugs 20 and when that occurs the deflected springs 42 will force the retracted clutch dogs into the space between lugs on the gear. The angled or oblique ends 42 on the clutch dogs result in the capability of the clutch dog, which initially entered a space between lugs 20, to be cammed out of that space and over one of the lugs 20 in the event that relative rotation beteen the gear 4 and shaft 6 moves that particular lug in the required direction. If relative rotation is in the other direction, the retracted lug will merely moved into engagement with a side face of one of the lugs 20 and its adjacent clutch dog will then be in a position to be spring urged inwardly to the position of FIG. 7. Clearly, in this position, direct drive will be maintained. The engaging faces between clutch dogs 40 and lugs 20 are in radial planes and there is, therefore, no resultant force urging the parts to separate. After the parts have been moved to the position of FIG. 5 and force on the shift fork 72 is released, ball detent 80 holds the sleeve 24 in this position and springs 76 return the shift fork to centralized relation to rib 70, all as shown in FIG. 5.

To effect disengagement of the parts from the FIG. 5 position, to "down-shift" by clutching gear 10 to shaft 6, the shift fork 72 is moved to the position shown in FIG. 6. This energizes one of the springs 76 and applies lateral pressure to the selector ring 68 to move the same to the position of FIG. 6 wherein the clutch pins 50 previously engaged with the left hand clutch ring 34 are released and the clutch elements 50, on the right hand side of the figures are forced outwardly into clutching engagement with the right hand clutch ring 34. The recesses 46 and the ends of clutch pins 50 are correspondingly shaped such that, with the parts in the position of FIG. 6, any torque between gear 4 and ring 34 will cause the pins 50 to cam inwardly free of the recesses 46. This selective declutching of one clutch ring and clutching of the other to the sleeve 24 is accomplished without axial movement of that sleeve, the sleeve being retained in its positive drive position by ball detent 80. In this condition, it is to be noted that the clutch ring 34 is no longer in clutched engagement with the sleeve 24 but is free to rotate thereon. Thus, the application of further force to the shift fork 72, toward the right, as seen in FIG. 6, will overcome the restraint of ball detent 80 and permit the sleeve 24 to move completely to the right to engage the right hand clutch ring and its clutch dogs 40 with gear 10 and its lugs 22. No torque of any substantial magnitude is being applied to the left hand clutch ring 34 and the same may, therefore, be readily and easily withdrawn from gear 4 and the engagement of the right hand clutch dogs 40 with lugs 22 of gear 10 occurs exactly as previously described in the description of the initial manipulation of the apparatus and thus a reduced speed drive is established from shaft 2 to shaft 6.

While a single specific embodiment of the invention has been shown and described, it is to be understood that many modifications may be made within the scope of the appended claims. For example, other means than the elements 50, 54, 60 may be employed to effect selective clutching of the rings 34 to the sleeve 24, or its equivalent, in response to axial movement of shift fork 72.

I claim:

1. A gear selector mechanism for selectively clutching either of adjacent members to a shaft relative to which both members are rotatable, comprising:

a circular series of lugs on that axial face of each member facing the other member;

a sleeve axially slidable but nonrotatable on said shaft between said members;

a clutch ring mounted on each end of said sleeve for rotation thereon and for axial movement therewith, each clutch ring having clutch dogs thereon engageable with said lugs on the adjacent member to drivingly connect said clutch ring and member;

interengaging positive clutching means for each clutch ring and selectively operable to positively clutch either of said rings to said sleeve;

a selector ring axially slidable on said sleeve between said clutching rings and operable, when slid axially on said sleeve, to first engage one of said positive clutching means of one clutch ring and to release the other then to engage said one clutch ring for sliding said rings and sleeve axially on said shaft to engage the clutch dogs of said one clutch ring into engagement with the lugs on one of said members; and actuator means for selectively moving said selector ring in either direction on said sleeve.

2. A selector as defined in claim 1 wherein said clutch dogs are axially slidable on said clutch rings and spring means urging said dogs toward the adjacent member, said dogs being so spaced on said clutch rings that adjacent dogs can enter the same space between adjacent lugs and simultaneously abut said lugs.

3. A selector as defined in claim 1 wherein both said positive clutching means are released when said selector ring is in an intermediate axial position on said sleeve.

4. A selector as defined in claim 1 including resilient detent means between said shaft and sleeve for releasably holding said sleeve in different axial positions on said shaft including a central position wherein all of said clutch dogs are axially spaced from the lugs on adjacent members.

5. A selector as defined in claim 4 wherein said selector ring is provided with a central circumferential rib on its outer surfaces, said actuator means being an axially movable shift fork having an inwardly open channel of greater width than said rib loosely embracing the same, and compression spring means between each side of said rib and the adjacent wall of said channel.

6. A selector as defined in claim 1 wherein said positive clutching means comprise inwardly facing recesses in inner peripheral faces of said clutch rings, clutch pins radially slidable in said sleeve into said recesses, and cam means for forcibly sliding said pins outwardly or releasing them for inward movement, said cam means being responsive to axial movement of selector ring on said sleeve.

7. A selector as defined in claim 6 wherein said recesses and pins have interengaging cam surfaces tending to force said pins out of said recesses in response to torque between said sleeve and ring.

* * * * *